Dec. 21, 1965  J. TELLERMAN  3,225,312
MAGNETOSTRICTIVE RESONATOR OF THE "WIEDEMANN EFFECT" TYPE
Filed Sept. 10, 1963  2 Sheets-Sheet 1
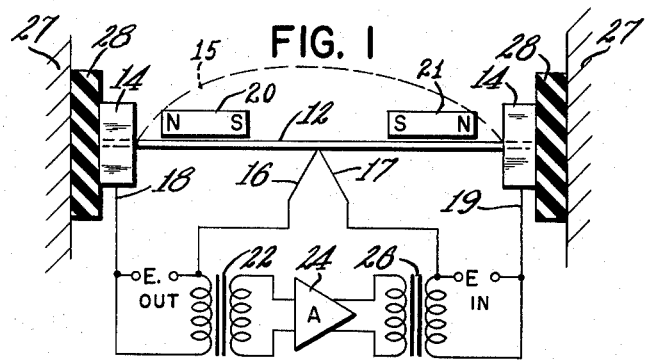
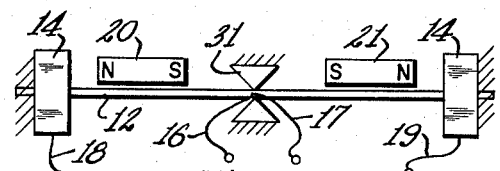
FIG. 2A
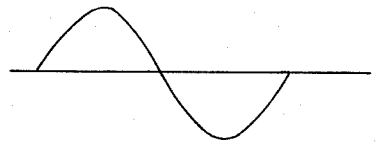
FIG. 2B
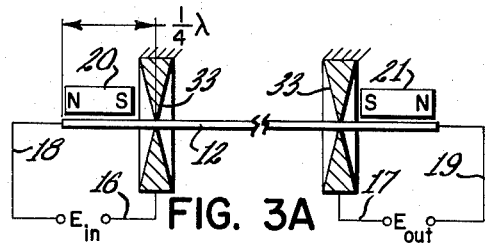
FIG. 3A
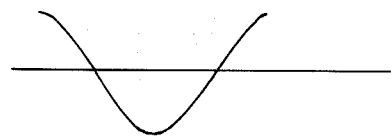
FIG. 3B
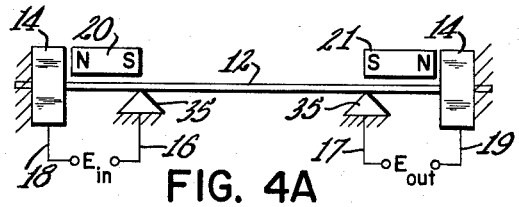
FIG. 4A
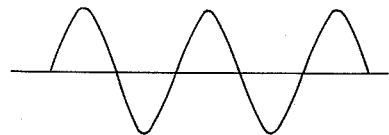
FIG. 4B
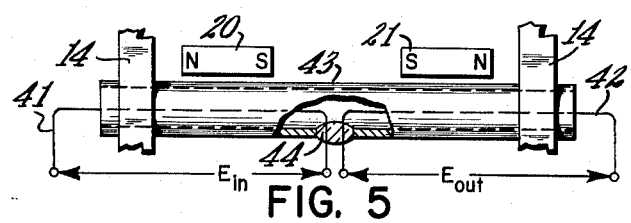
FIG. 5
INVENTOR.
JACOB TELLERMAN
BY *Jerome Bauer*
ATTORNEY Dec. 21, 1965  J. TELLERMAN  3,225,312
MAGNETOSTRICTIVE RESONATOR OF THE "WIEDEMANN EFFECT" TYPE
Filed Sept. 10, 1963  2 Sheets-Sheet 2

INVENTOR.
JACOB TELLERMAN
BY
*Jerome Bauer*
ATTORNEY

United States Patent Office 3,225,312
Patented Dec. 21, 1965

3,225,312
MAGNETOSTRICTIVE RESONATOR OF THE
"WIEDEMANN EFFECT" TYPE
Jacob Tellerman, Bayside, N.Y., assignor to Tempo
Instrument, Incorporated, Plainview, N.Y., a corporation of New York
Filed Sept. 10, 1963, Ser. No. 307,850
14 Claims. (Cl. 331—157)

This invention relates to magnetostrictive resonators of the "Wiedemann Effect" type which resonate in a torsional mode.

Stated very simply, the apparatus of this invention comprises a small ferromagnetic rod which is terminated at its extremities in fixed reflecting masses. With the rod subjected to a longitudinal magnetic field, current is then passed longitudinally through a portion of the rod, causing the rod to twist in accordance with the "Wiedemann Effect." In turn, the twisting of the rod induces a voltage in the other portion of the rod, which voltage is sensed by a pair of suitably placed leads.

The device of this invention satisfies the requirement for a compact resonator device that may be employed under conditions of extreme vibration and/or conditions of widely varying temperature.

Since the rod is restrained at the ends it is not as subject to vibration as an unclamped rod. Further, the mode of operation depends on torsional motion and accordingly, is independent of any longitudinal vibration, making it relatively free from the usual vibratory problems. The device is quite small, a rod adapted to resonate at 50 kc. is but 1 in. long, and 0.030 in. in diameter. Since it has little mass the effect of shock is minimized.

Thus, vibration in the frequency range of from 65 cycles to 2,000 cycles per second with amplitudes of as high as 30 G's and shocks of 1,000 G magnitude have been found to have no adverse effect on the device.

As will be explained more fully hereinafter, the construction is such as to permit compensation for variation over a wide range of temperatures. For example, employing a "NI-SPAN-C" rod ±0.01% frequency deviation over the temperature range −55° C. to 85° C. may be maintained. With compensation, as will be explained hereinafter, a frequency stability over the same range of ±0.003% can be readily obtained.

Accordingly, it is an object of this invention to provide an improved magnetostrictive resonator capable of operating in a vibratory environment.

Still another object of this invention is to provide a rigidly secured magnetostrictive resonator.

It is an object of this invention to provide an improved magnetostrictive device.

It is a further object of this invention to provide an improved magnetostrictive device of small dimension.

A particular object is to provide a magnetostrictive device which is not subject to vibration effects.

Another object is to provide an improved harmonic generator of the magnetostrictive type.

Another particular object is to provide a magnetostrictive device having improved reflecting elements.

These and still other objects and features of the invention will, in part, be pointed out with particularity and will, in part, become obvious from the following more detailed description of the invention, taken in conjunction with the accompanying drawing, which forms an integral part thereof.

In the various figures of the drawing like reference characters designate like parts.

In the drawing:

FIG. 1 shows partially pictorially and partially schematically the apparatus of this invention embodied in an oscillator.

FIG. 2A represents pictorially a second harmonic generator embodiment of the invention.

FIG. 2B represents the standing wave produced by the apparatus of FIG. 2A.

FIG. 3A and FIG. 3B show pictorially and graphically, respectively, an alternative second harmonic resonator and standing wave produced thereby.

FIG. 4A and FIG. 4B show pictorially and graphically, respectively, a fifth harmonic resonator and standing wave produced thereby.

FIG. 5 shows pictorially a tubular embodiment of the invention with a portion broken away.

Figure 6:
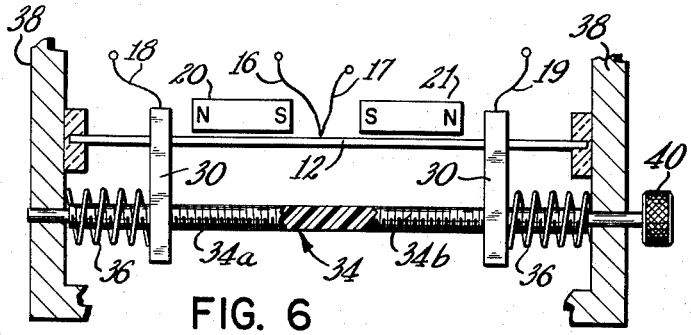
FIG. 6 shows pictorially a mechanically tunable version of the apparatus.

The device of this invention operates in accordance with the "Wiedemann Effect." The "Wiedemann Effect" relates to the twisting motion or shear effect obtained in a ferromagnetic rod when it conducts an electric current and is concurrently exposed to a longitudinal magnetic field. The inverse is also true; i.e., a voltage is induced along a ferromagnetic rod, if the rod is twisted while subjected to a longitudinal magnetic field.

The basic device is shown in FIG. 1. The device comprises a ferromagnetic rod 12, which may be tubular or a solid wire. Typically the rod has a diameter of 0.030 in. diameter and is the order of one inch in length. A suitable material for the rod is "NI-SPAN-C," although other suitable magnetostrictive materials are known to those familiar with the art.

The rod 12 is mounted between reflecting discs 14. Conductive leads 16 and 17 are welded to the center of the rod. Likewise, leads 18 and 19 are connected to the ends of the rods. Thus, leads 16 and 18 may be used as a pair of input leads, and leads 17 and 19 may be used as the output leads. Magnets 20, 21 are used to provide a longitudinal magnetic field.

When a current is introduced into one side of the rod, as between leads 17 and 19, a torsional strain wave is generated and reflected between the reflecting members 14. An output signal may then be picked off between leads 16 and 18, and fed to step-up transformer 22 which is used for impedance matching between the rod and the input of amplifier 24. The impedance of the bar is usually but a small fraction of an ohm per inch. Likewise, the output of amplifier 24 is coupled to the other side of the rod by step-down transformer 26. As the voltage is picked off between terminals 16 and 18 it is amplified and used to drive the portion of the rod between terminals 17 and 19. It will be appreciated by those experienced in the electronics art, that the amplifier should have a gain of greater than 1, and that the proper phase relationship between output and input should be maintained.

The oscillator frequency is related to rod length and torsional wave propagation velocity as follows:

$$f_n = \frac{V}{2L} = \sqrt{\frac{E_s \rho}{2L}}$$

Where
$f_n$ = Natural frequency of the rod
$L$ = length of the rod $E_s$ = shear modulus
$\rho$ = density of the rod $$V = \text{torsional wave velocity} = \sqrt{\frac{E_s}{\rho}}$$

The diameter of the rod should be substantially less than the wave length of the oscillating frequency. From the foregoing equation it will be appreciated that a 50 kc. oscillator would employ a rod approximately 1 inch long, using alloys that have a V equal to 100,000 inch per second.

Figure 9:
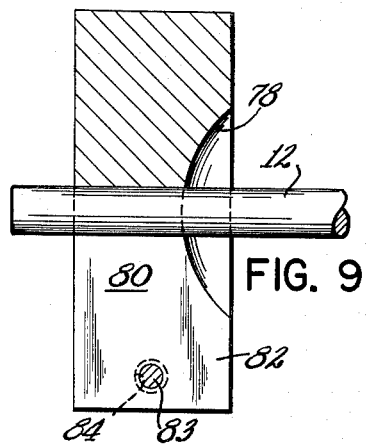
FIG. 9 is a section taken along line 9—9 of FIG. 8.
Figure 8:
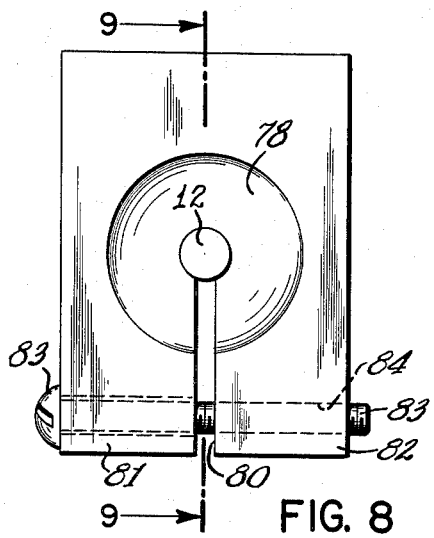
FIG. 8 is an elevation view illustrating preferred end reflector means.

The reflecting discs act as mechanical reflecting ends and should be larger in diameter than the rod to obtain a sufficient change of mechanical impedance and maintain a high Q as will be explained more fully hereinafter. A significant improvement in the performance of the reflecting disc is obtained when the discs are provided with a recess 78 encircling the rods in cup fashion as shown in FIGS. 8 and 9. A longitudinal thickness of about 1/8 inch is satisfactory. A convenient clamping means is provided by forming a slot 80 in the member and then clamping the separated portions 81 and 82 together by means of screw 83 which mates with threaded bore 84.

The mechanical impedance can be expressed as:

$$Z_{torsional} = \frac{\pi r^4}{2}\sqrt{\frac{E_s}{\rho}}$$

where $r$ is the radius of the medium under consideration. A sufficiently large differential of impedance can be achieved with the reflecting masses having a radius only three times larger than the rod. It is to be noted that this is not true in a longitudinal rod system where the mechanical impedance is proportional to area.

The reflecting masses may be rigidly secured to a supporting base 27 such as a metal chassis by welding or cementing techniques. Currently it is preferred to interpose rubber pads 28, which may comprise a simple silicone rubber cement bond between the reflecting masses and the base.

The resultant standing wave waveform of the device shown in FIG. 1 is illustrated by the dashed line in FIG. 1 and is designated by the numeral 15. To extend the frequency range upwardly without making the rod length physically too short to be conveniently handled, the rods can be forced to resonate at a harmonic frequency. For example, a second harmonic oscillator can be formed by introducing another node in the center where the electrical connections are made. This may be done by restraining the center mechanically by knife-edge clamp 31 as shown in FIG. 2A. The resultant wave form is shown in FIG. 2B. Still another approach is shown in FIG. 3A where the second harmonic is obtained by moving knife-edge clamps 33 inwardly of the end by a distance equal to $\lambda/4$. The resultant standing wave waveform is shown in FIG. 3B. It should be noted that to avoid loading of the rod, members 33 should be knife-edge type restraints.

In FIG. 4A and FIG. 4B there is shown the use of reflector masses 14 and knife-edge supports 35 to obtain the fifth harmonic. Thus, by different methods of support, various standing wave patterns can be obtained to multiply the frequency of oscillation. It should be noted that at higher frequencies it is desirable to use the tubular structure rather than a solid rod to reduce the effect of eddy currents, which increase the input-output attenuation characteristics.

A further advantage of the tubular construction is that it permits the use of conducting wires 41 and 42 passed through tube 43, to excite the resonator, and to pick off the induced voltage. This arrangement also has the advantage of lowering the input impedance and the output impedance, and thereby permitting more efficient operation. Further, since the wires are brought out at the center hole the need for a weld at that point as shown in the embodiment of FIG. 1 is eliminated, and thus mechanical loading at the center is minimized. The wires are brought out through the center hole and should be rigidly fixed at that point. A suitable method for accomplishing this is by the use of a sintered glass bead 44, which may be fused in place. In operation, the torsional movement of the bar 43 (FIG. 5) distorts the magnetic field surrounding the lead 42. This distorted field causes the lead 42 to be cut by the magnetic lines of force thereby inducing a voltage in the lead which appears across the output terminals.

A variable frequency resonator is shown in FIG. 6 which provides means for adjusting the effective length of the resonator rod. Reflecting members 30 are slideably mounted on rod 12 and are threadably engaged on left-handed and right-handed screws 34a and 34b, respectively, of adjustment shaft 34. The reflecting members are spring loaded against supporting frame 38 by means of springs 36. A knob 40 fixedly mounted on adjustment shaft 34 permits the adjustment of the position of the members. The reflecting members provide a mechanical reflection or shorting effect, and accordingly, their position determines the output frequency. It has been found that a minor adjustment of frequency, say 5% to 10% may be obtained by adjusting only one end, i.e. either the input or the output end need be adjusted. If continuous adjustment over a wide range is required, the double adjustment shown in FIG. 6 should be employed.

Figure 7:
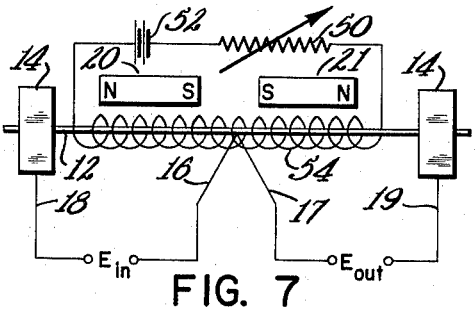
FIG. 7 shows pictorially an electrically tunable version of the apparatus.

The presence of a magnetic field modifies the modulus of elasticity of the magnetostrictive rod, thus changing the velocity of propagation of sonic waves, and in turn the natural frequency of the rod. By varying the magnitude of magnetic field the output frequency of the device may be varied. In FIG. 7 there is shown an alternative embodiment of the invention, wherein rheostat 50 is used to vary the current from electric power source 52, passing through winding 54 and in turn varying the resultant magnetic field to which the rod is subjected. It will be appreciated that other means of varying the current may be employed. For example the coil may be in a servo-loop so as to provide automatic frequency change pursuant to a control signal.

There are alloys of nickel, iron, titanium; nickel, iron, titanium and chromium; and nickel, iron, molybdenum that in a magnetostrictive device show but a small frequency change with temperature because their modulus of elasticity and change of length vary in such a way to maintain a constant resonant frequency, in accordance with the following equation:

$$f_n = \frac{\sqrt{\frac{E}{\rho}}}{2L}$$

Where $f_n$ = frequency
$E_s$ = modulus of elasticity (Shear Modulus)
$\rho$ = density
$L$ = length This stability is complete over but a limited range. To extend this temperature range, materials showing positive change of frequency variations with temperature can be combined with those having negative changes by butt welding them together. Thus, if a given material of unity length shows a frequency variation with temperature expressed as:

$$\frac{\Delta f}{f} = +K_1 \Delta T \qquad \text{(material 1)}$$

and another shows a minus variation:

$$\frac{\Delta f}{f} = -K_2 \Delta T \qquad \text{(material 2)}$$

then the combination should be made so that $$\frac{K_1}{K_2} = \frac{L_2}{L_1} \times \frac{v_1}{v_2}$$

where $L_1$ is the length and $$v_1 = \sqrt{\frac{E_1}{\rho_1}} \quad \text{(material 1)}$$

and $L_2$ is the length and $$v_2 = \sqrt{\frac{E_2}{\rho_2}} \quad \text{(material 2)}$$

The two rods must be of such radii so that their mechanical impedances are equal or $r_1^4\sqrt{E_{s1}\rho_1} = r_2^4\sqrt{E_{s2}\rho_2}$ where $r_1$ is the radius of material 1 and $r_2$ is the radius of material 2.

Figure 10:
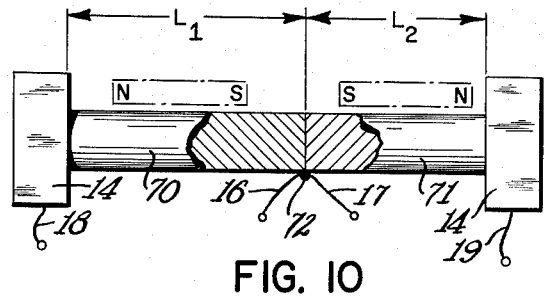
FIG. 10 is a pictorial view, partially sectional, of an embodiment which is frequency stabile with respect to temperature.

To achieve a low frequency variation with temperature, a resonator was built utilizing a combination of wire. As shown in FIG. 10 portion 70 of the resonator wire was composed of 42% nickel iron alloy which shows an increase of frequency of approximately 110 p.p.m./° C. over a range of −25° C. to +75° C. The other section, portion 71, of the resonator wire was formed of pure nickel which shows a decrease of frequency of 145 p.p.m./° C. over the same temperature range. It is to be noted that both materials have good magnetostrictive properties.

Both wires provide equal sonic velocities since $$V = \sqrt{\frac{E_s}{\rho}}$$

and both materials have approximately equal shear moduli ($E_s$) and densities ($\rho$). Thus, in accordance with the relationship disclosed earlier:

$$\frac{K_1}{K_2} = \frac{L_2}{L_1} \times \frac{v_1}{v_2}$$

which can be rewritten as:

$$\frac{K_1}{K_2} = \frac{L_2}{L_1}$$

and the individual lengths were accordingly determined as follows:

$$\frac{K_1}{K_2} = \frac{110}{145} = \frac{L_2}{L_1}$$

where $L_1$ was 42% nickel alloy material and $L_2$ was pure nickel material.

Since the $E_s$ of the two materials is approximately equal, as well as their density, the diameters of the two materials could be made equal without any mechanical mismatch at the butt weld 72 joining the two wires.

Utilizing the wires in the above proportion whereby the total wire length was 1″ long, and 0.030″ diameter, a resonator of approximately 58 kc. was built.

Upon test the resonator was found to have less than ±.003% frequency variation over the range −25° C. to +75° C.

There have been disclosed heretofore the best embodiments of the invention presently contemplated and it is to be understood that various changes and modifications may be made by those skilled in the art without departing from the spirit of the invention.

What is claimed is:

1. A magnetostrictive device comprising in combination:
   (a) an elongated magnetostrictive rod;
   (b) a fixed pair of spaced reflecting masses clamped to said rod;
   (c) signal input means connected to one of said reflecting masses and a terminal point on said rod;
   (d) signal output means connected to the other of said reflecting masses and a terminal point on said rod; and
   (e) a pair of magnets adapted to longitudinally magnetize said rod, each one of said pair of magnets being positioned between a different one of said reflecting masses and a said terminal point.

2. The device of claim 1 wherein each of said reflecting masses is provided with a walled, concave recess, said recesses facing each other whereby a portion of said rod is within said mass and in spaced relationship to the wall of said recesses.

3. The device of claim 1 wherein said rod is composed of a pair of magnetostrictive members butt welded in end-to-end relationship, one of said members exhibiting a positive temperature coefficient of frequency and the other of said members exhibiting a negative temperature coefficient of frequency.

4. The device of claim 1 including adjustable magnetic field generating means adapted to provide a magnetic field to which said rod is subject.

5. The device of claim 1 including means to restrain said rod against movement at a point intermediate said reflecting masses.

6. The device of claim 1 including a lead screw having a right hand thread and a left hand thread coupled respectively to one of said pair of spaced reflecting masses, said lead screw being adapted when rotated to move said pair of spaced reflecting masses in opposite directions along said rod.

7. A magnetostrictive device comprising in combination:
   (a) an elongated magnetostrictive rod;
   (b) a pair of spaced reflecting masses clamped to said rod;
   (c) movement restraining means fixed to said masses;
   (d) signal input means connected to one of said reflecting masses and a terminal point on said rod intermediate said pair of reflecting masses;
   (e) signal output means connected to the other of said reflecting masses and a terminal point on said rod intermediate said pair of reflecting masses; and
   (f) a pair of magnets adapted to longitudinally magnetize said rod, each one of said pair of magnets being positioned between a different one of said reflecting masses and a said intermediate terminal point.

8. A magnetostrictive device comprising in combination:
   (a) an elongated walled, tubular magnetostrictive rod;
   (b) a pair of spaced reflecting masses clamped to said rod;
   (c) movement restraining means fixed to said masses;
   (d) signal input means comprising a conductive wire extending through the interior of said rod from a point outside said reflecting masses and exiting through the wall of said rod at a point on said rod intermediate said reflecting masses;
   (e) signal output means comprising a conductive wire extending through the interior of said rod from a a point outside said reflecting masses and exiting through the wall of said rod at a point on said rod intermediate said reflecting masses; and
   (f) a pair of magnets adapted to longitudinally magnetize said rod, each one of said pair of magnets being positioned between a different one of said reflecting masses and a said intermediate point.

9. The device of claim 8 wherein each of said reflecting masses is provided with a walled, concave recess, said recesses facing each other whereby a portion of said rod is within said mass and in spaced relationship to the wall of said recesses.

10. The device of claim 8 wherein said wires are rigidly fixed to the wall of said rod at the point of exit.

11. A variable frequency magnetostrictive oscillator comprising in combination:
   (a) an elongated magnetostrictive rod;
   (b) a pair of spaced reflecting masses slidingly mounted on said rod;

(c) rotation preventing means fixed to the ends of said rod;
(d) signal input means connected to one of said reflecting masses and a terminal point on said rod intermediate said reflecting masses;
(e) signal output means connected to the other of said reflecting masses and a terminal point on said rod intermediate said reflecting masses;
(f) a pair of magnets adapted to longitudinally magnetize said rod, each one of said pair of magnets being positioned between a different one of said reflecting masses and a said intermediate terminal point;
(g) adjustment means for moving said reflecting masses longitudinally along said rod to change the natural frequency of vibration, said adjustment means comprising a linkage coupled to said pair of reflecting masses whereby movement of said linkage causes said masses to slide along said rod in opposite directions; and
(h) an amplifier having a gain of greater than unity, said amplifier being provided with an input circuit connected to said signal output means and an output circuit connected to said signal input means.

12. A variable frequency magnetostrictive oscillator comprising in combination:
(a) an elongated magnetostrictive rod;
(b) a pair of spaced reflecting masses clamped to said rod;
(c) movement restraining means fixed to said masses;
(d) signal input means connected to one of said reflecting masses and a terminal point on said rod intermediate said reflecting masses;
(e) signal output means connected to the other of said reflecting masses and a terminal point on said rod intermediate said reflecting masses;
(f) a pair of magnets adapted to longitudinally magnetize said rod, each one of said pair of magnets being positioned between a different one of said reflecting masses and a said intermediate terminal point;
(g) an amplifier having a gain of greater than unity, said amplifier being provided with an input circuit connected to said signal output means and an output circuit connected to said signal input means; and
(h) an adjustable intensity magnetic field generating means positioned proximate said rod whereby said rod is within the influence of the flux generated by said last named means for varying the output frequency of said oscillator.

13. The oscillator of claim 12 wherein said adjustable intensity magnetic field generating means comprises an electric winding and adjustable current means for energizing said winding.

14. A magnetostrictive device comprising in combination:
an elongated magnetostrictive rod;
a fixed pair of spaced reflecting masses clamped to said rod;
signal input means connected to one of said reflecting masses and a terminal point on said rod;
signal output means connected to the other of said reflecting masses and a terminal point on said rod;
a pair of magnets adapted to longitudinally magnetize said rod, each one of said pair of magnets being positioned between a different one of said reflecting masses and a said terminal point;
and adjustment means whereby said pair of spaced reflecting masses are adapted to be longitudinally moved along said rod,
said adjusting means comprising a linkage coupled to said pair of reflecting masses whereby movement of said linkage causes said masses to slide along said rod in opposite directions.

References Cited by the Examiner

UNITED STATES PATENTS

| Re. 19,461 | 2/1935 | Pierce | 331—157 |
| 2,454,933 | 11/1948 | Luck | 332—26 |
| 2,612,603 | 9/1952 | Nicholson | 333—71 X |
| 2,760,168 | 8/1956 | Doelz et al. | 331—157 X |
| 3,011,081 | 11/1961 | Dubský et al. | 310—26 |
| 3,015,708 | 1/1962 | Mason | 310—26 X |
| 3,016,524 | 1/1962 | Edmunds | 310—26 X |
| 3,129,395 | 4/1964 | Mason | 333—71 X |

FOREIGN PATENTS 784,689  10/1957  Great Britain.

ROY LAKE, *Primary Examiner.*

JOHN KOMINSKI, *Examiner.*

J. B. MULLINS, *Assistant Examiner.*